US008589517B2

(12) United States Patent
Hoefelmeyer et al.

(10) Patent No.: US 8,589,517 B2
(45) Date of Patent: Nov. 19, 2013

(54) SYSTEMS AND METHODS FOR PROVIDING SELF-COMPILING, PEER-TO-PEER ON-LINE GAMING

(75) Inventors: Ralph S. Hoefelmeyer, Colorado Springs, CO (US); Shawn E. Wiederin, Cedar Rapids, IA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 2481 days.

(21) Appl. No.: 10/699,824

(22) Filed: Nov. 4, 2003

(65) Prior Publication Data

US 2005/0096133 A1 May 5, 2005

(51) Int. Cl.
*G06F 15/16* (2006.01)

(52) U.S. Cl.
USPC ............................ 709/220; 709/221; 709/222

(58) Field of Classification Search
USPC .............. 709/217–223; 463/40; 717/168–178
See application file for complete search history.

(56) References Cited

U.S. PATENT DOCUMENTS 6,358,150 B1 * 3/2002 Mir et al. ........................ 463/28
6,487,522 B1 * 11/2002 Smith et al. ................... 702/186
6,666,769 B2 * 12/2003 Stronach .......................... 463/40
6,671,729 B1 * 12/2003 Gordon et al. ................ 709/227
6,934,956 B1 * 8/2005 Allen ............................ 719/327
6,981,251 B1 * 12/2005 Kreller et al. ................. 717/171
7,036,083 B1 * 4/2006 Zenith ........................... 715/758
7,155,710 B2 * 12/2006 Breckner et al. .............. 717/168
7,159,008 B1 * 1/2007 Wies et al. .................... 709/206
7,993,194 B1 * 8/2011 Bond .............................. 463/20
2001/0044339 A1 * 11/2001 Cordero et al. ................. 463/42
2002/0013882 A1 * 1/2002 Ko et al. ....................... 711/111
2002/0068592 A1 * 6/2002 Hutcheson et al. ........... 455/501
2002/0138594 A1 * 9/2002 Rowe ............................ 709/219
2003/0061285 A1 * 3/2003 Usui et al. ..................... 709/205
2003/0084165 A1 * 5/2003 Kjellberg et al. ............. 709/227
2003/0085522 A1 * 5/2003 Loder ........................... 273/292
2003/0224858 A1 * 12/2003 Yoseloff et al. ................. 463/43
2003/0232648 A1 * 12/2003 Prindle ............................ 463/40
2004/0002384 A1 * 1/2004 Multerer et al. ................ 463/42
2004/0003039 A1 * 1/2004 Humphrey et al. ........... 709/204
2004/0015608 A1 * 1/2004 Ellis et al. ..................... 709/246
2007/0214169 A1 * 9/2007 Audet et al. .................. 707/102

* cited by examiner

*Primary Examiner* — Kenny Lin

(57) ABSTRACT

A device includes a memory and a processor. The processor may be configured to receive a gaming package. The gaming package may include an operating system, a script for detecting a hardware configuration of the device, software for accessing a network, and peering software. The processor may be further configured to establish a peer-to-peer gaming session with another device over the network.

27 Claims, 9 Drawing Sheets

| ALIAS FIELD 302 | FIRST NAME 304 | LAST NAME 306 | ZIP CODE 308 | CURRENT NETWORK ADDRESS FIELD 310 |
|---|---|---|---|---|
| bobsmith | BOB | SMITH | 22030 | 123.111.45.678 |
| ralphsmith | RALPH | SMITH | 20121 | 456.123.78.123 |
| kevinsmith | KEVIN | SMITH | 15139 | 123.456.78.901 |
| jordensmith | JORDEN | SMITH | 90210 | 102.345.67.890 |

350

351

| BACKGAMMON | | | |
|---|---|---|---|
| ALIAS 352 | DATE 354 | TIME 356 | PREFERENCES 358 |
| bobsmith | 08:10:03 | 15:12:10 | |
| ralphsmith | 08:10:03 | 15:12:58 | |
| jordensmith | 08:10:03 | 15:13:31 | |
| bobsmith | 08:10:03 | 15:17:04 | |

FIG. 3B

SYSTEMS AND METHODS FOR PROVIDING SELF-COMPILING, PEER-TO-PEER ON-LINE GAMING

FIELD OF THE INVENTION

The present invention relates generally to communications networks and, more particularly, to systems and methods for providing peer-to-peer gaming in a communications network.

BACKGROUND OF THE INVENTION

Users access the Internet for a variety of objectives, including to socially and competitively interact with others as a form of entertainment. The playing of games (e.g., board games, card games, etc.) over the Internet (on-line games) enables players to enjoy the games with others who may reside at distant locations from each other.

Currently, when a user desires to participate in an on-line gaming session with a second user, the users connect, typically for a subscription fee, to a centralized server that manages the on-line gaming session. Instances may arise when users are prevented from participating in on-line gaming. For example, the centralized servers are subject to bandwidth limitations and are vulnerable to network attacks (e.g., denial of service attacks), outages due to natural or man-made disasters, etc. Customer satisfaction may be diminished during such instances.

There exists a need for systems and methods that improve on-line gaming.

SUMMARY OF THE INVENTION

Systems and methods consistent with the principles of the invention address this and other needs by providing peer-to-peer on-line gaming in a communications network.

In an implementation consistent with the principles of the invention, a method for establishing a gaming session between a first network device, which includes an operating system, and at least one second network device in a communications network is provided. The method may include modifying the first network device for the gaming session, where the modifying the first network device includes loading a new operating system. The method may further include connecting the first network device to the communications network, and establishing a peer-to-peer gaming session with the at least one second network device.

In another implementation consistent with the principles of the invention, a device that includes a memory and a processor is provided. The processor may be configured to receive a gaming package. The gaming package may include an operating system, a script for detecting a hardware configuration of the device, software for accessing a network, and peering software. The processor may be further configured to establish a peer-to-peer gaming session with another device over the network.

In yet another implementation consistent with the principles of the invention, a network includes a server and a group of network devices. The server may be configured to provide a list of games. Each of the network devices may be configured to select one game in the list of games, and establish a peer-to-peer gaming session with at least one other network device in response to selecting the one game.

In still another implementation consistent with the principles of the invention, a network device includes means for receiving a gaming package, where the gaming package includes an operating system, a script for detecting a hardware configuration of the network device, software for accessing a network, peering software, and gaming software. The network device may further include means for installing the operating system, software for accessing the network, the peering software, and the gaming software and means for establishing a peer-to-peer gaming session with at least one other network device using the software for accessing the network, the peering software, and the gaming software.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 3A and 3B illustrate an exemplary configuration of the warehouse of FIG. 1 in an implementation consistent with the principles of the invention;

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations consistent with the principles of the invention provide peer-to-peer gaming in a communications network.

Exemplary System

Figure 1:
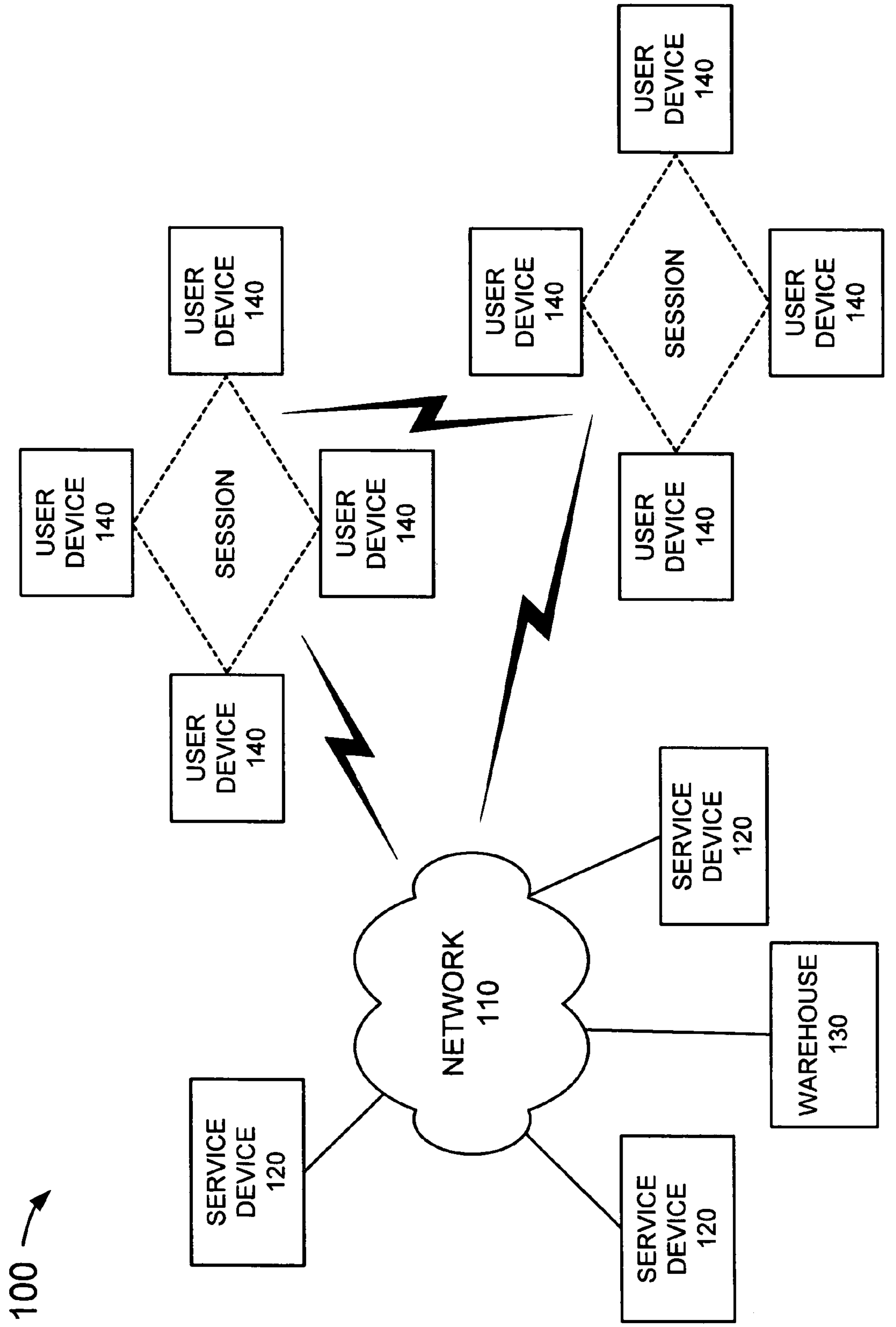
FIG. 1 illustrates an exemplary system in which systems and methods, consistent with the principles of the invention, may be implemented.

FIG. 1 illustrates an exemplary system 100 in which systems and methods, consistent with the principles of the invention, may be implemented. As illustrated, system 100 may include a network 110, service devices 120, a warehouse 130, and user devices 140. The number of devices illustrated in FIG. 1 is provided for simplicity. In practice, a typical system could include more or fewer devices than illustrated in FIG. 1.

Network 110 may include one or more networks, such as the Internet, an intranet, a local area network (LAN), a wide area network (WAN), or another type of network that is capable of transmitting data from a source device to a destination device. Network 110 may also or alternatively include one or more public switched telephone networks (PSTNs) or other types of switched networks. Network 110 may include one or more wired, wireless, and/or optical networks.

Service devices 120 may include one or more types of computer systems, such as a mainframe, minicomputer, or personal computer. Service devices 120 may be located at separate geographic locations for redundancy purposes. Service devices 120 may use well-known hardening and resiliency designs for load balancing and survivability in case of natural disaster, network outages, network attacks, etc. In one implementation, service devices 120 may be built using Linux Beowolf clusters, or similar clustering technologies. Although not specifically illustrated in FIG. 1, service devices 120 may include, for example, web servers, transaction servers, gaming scenario storage, authentication and authorization mechanisms, premium service servers, and virtual private network (VPN) routers. In one implementation, the web servers may be built using web serving software, such as the Apache web server software. The gaming scenario storage may be an IP-based storage device. The authentication and authorization mechanisms, transaction and premium service servers, and VPN routers may be Linux-based.

Warehouse 130 may include one or more separate databases for storing data. Warehouse 130 may act as a repository for network information. The network information may, for example, include account information, such as, user information, information relating to user devices 140, and/or information relating to the gaming sessions formed by user devices 140. The network information may be used by system administrators for targeting information or services (e.g., premium services, advertisements, etc.) to users in system 100. Warehouse 130 may be located within one or more of service devices 120 or, as illustrated in FIG. 1, external to service devices 120. In the latter situation, warehouse 130 may connect to network 110 via wired, wireless, or optical connections.

User devices 140 may include devices, such as wireless telephones, personal computers, personal digital assistants (PDAs), lap tops, etc., threads or processes running on these devices or other types of devices (e.g., televisions, video game consoles, or the like), and/or objects executable by these devices. In one implementation, user devices 140 may include past-generation hardware (i.e., hardware that is 2 to 3 generations out of current general use; the hardware may be slower or less powerful than most consumers would prefer). User devices 140 may connect to network 110 and to each other via wired, wireless, or optical connections.

Figure 2:
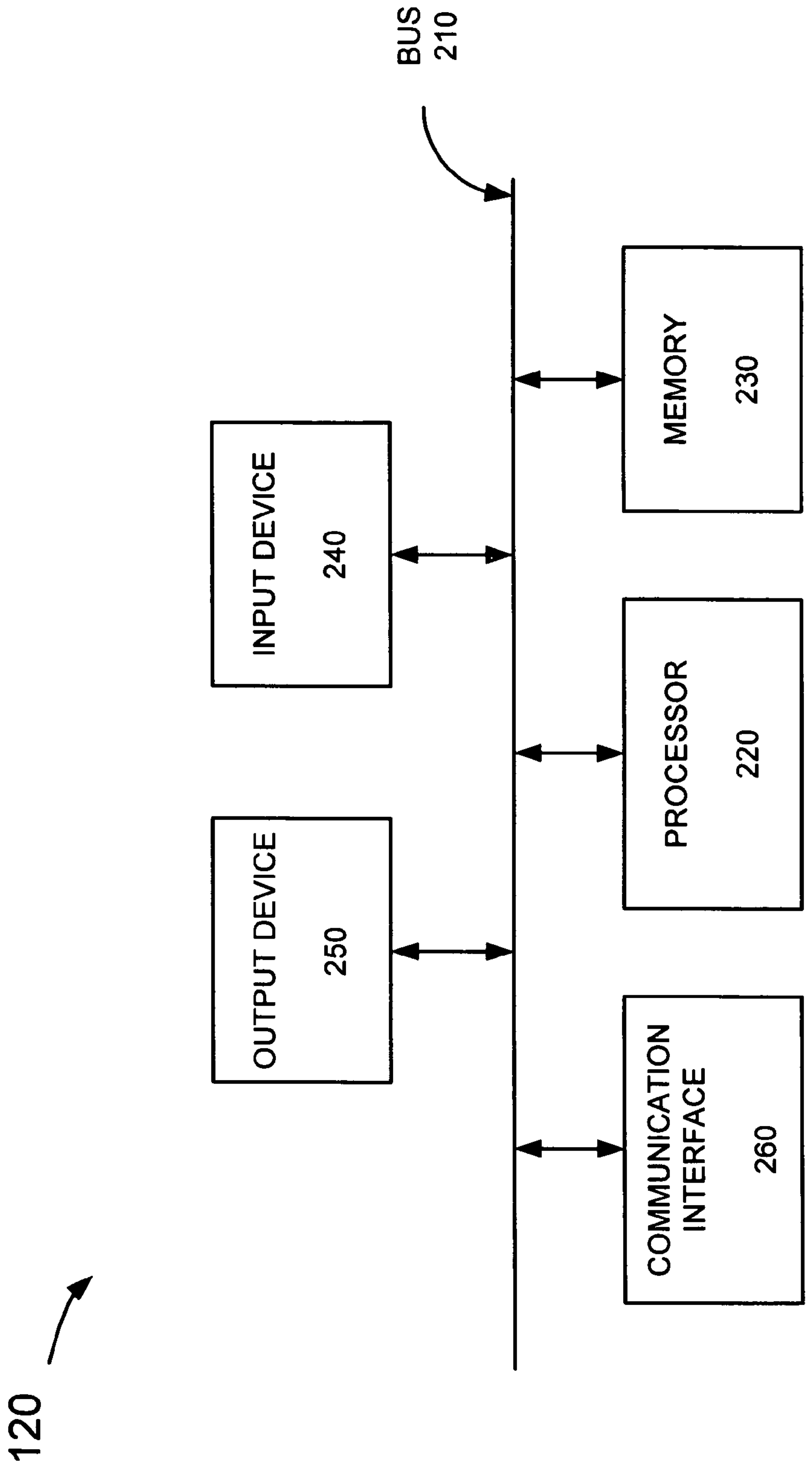
FIG. 2 illustrates an exemplary configuration of the service device of FIG. 1 in an implementation consistent with the principles of the invention.

FIG. 2 illustrates an exemplary configuration of service device 120 in an implementation consistent with the principles of the invention. It will be appreciated that warehouse 130 may be similarly configured. As illustrated, service device 120 may include a bus 210, a processor 220, a memory 230, an input device 240, an output device 250, and a communication interface 260. Bus 210 may include one or more conventional buses that allow communication among the components of service device 120.

Processor 220 may include any type of conventional processor or microprocessor that interprets and executes instructions. Memory 230 may include a random access memory (RAM) or another type of dynamic storage device that stores information and instructions for execution by processor 220; a read only memory (ROM) or another type of static storage device that stores static information and instructions for use by processor 220; and/or some type of magnetic or optical recording medium and its corresponding drive.

Input device 240 may include one or more conventional devices that permit an operator to input information to service device 120, such as a keyboard, a mouse, a pen, a microphone, one or more biometric mechanisms, and the like. Output device 250 may include one or more conventional devices that outputs information to the operator, including a display, a printer, a speaker, etc. Communication interface 260 may include any transceiver-like mechanism that enables service device 120 to communicate with other devices and/or systems. For example, communication interface 260 may include mechanisms for communicating with user devices 140 via a network, such as network 110.

Execution of the sequences of instructions contained in memory 230 causes processor 220 to perform the functions described below. In alternative embodiments, hardwired circuitry may be used in place of or in combination with software instructions to implement the present invention. Thus, the present invention is not limited to any specific combination of hardware circuitry and software.

Figure 3A:
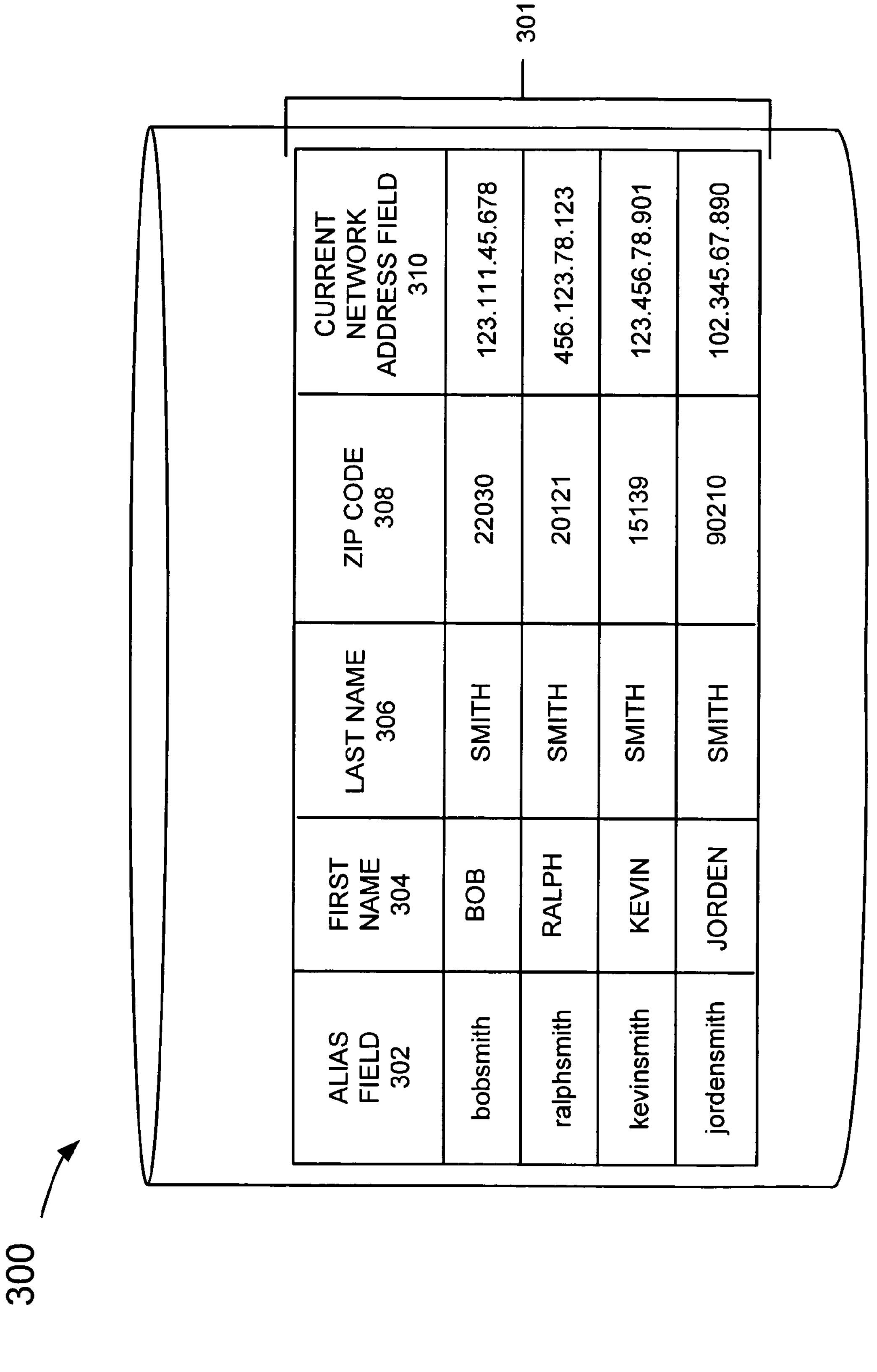

FIGS. 3A and 3B illustrate an exemplary configuration of warehouse 130 in an implementation consistent with the principles of the invention. As set forth above, warehouse 130 may be located within one or more of service devices 120 or external to service devices 120. Warehouse 130 may include one or more database for customer satisfaction and/or marketing purposes. The databases in warehouse 130 may store user information and information relating to the gaming sessions in which the users participate.

FIG. 3A illustrates an exemplary database 300 that may be stored in warehouse 130. Database 300 may include a group of entries 301. Each entry 301 may include information stored in one or more of the following exemplary fields: an alias field 302, a first name field 304, a last name field 306, a zip code field 308, and a current network address field 310. Database 300 may include additional (or alternative) fields (not shown) than those illustrated in FIG. 3A. For example, database 300 may further include full address information for each user, a telephone number for each user, a personal identification number (PIN), or the like.

Alias field 302 may store a name or identifier that uniquely identifies a user. First name field 304 may store a first name of the corresponding user identified in alias field 302. Last name field 306 may store a last name of the corresponding user identified in alias field 302. Zip code field 308 may store a zip code (or other address information) of the corresponding user identified in alias field 302. The information in zip code field 308 may aid in the targeting of goods or services based on geographic location of users. Current network address field 310 may store an address assigned to the user for a current network session. In an implementation consistent with the present invention, the network address may be an Internet protocol (IP) address. It will be appreciated that the user's IP address may, for example, be different each time that he or she logs on to his/her Internet service provider (ISP) or intranet connection.

Warehouse 130 may also include one or more databases for tracking the gaming sessions in which the users in system 100 participate. One database may be associated with all of the games in system 100. Alternatively, a separate database may be associated with each game type. FIG. 3B illustrates an exemplary database 350 that may be used to track participation in a particular game (e.g., backgammon) in an implementation consistent with the principles of the invention. Database 350 may include a group of entries 351. Each entry 351 may include information stored in one or more of the following exemplary fields: an alias field 352, a date field 354, a time field 356, and a preferences field 358. Database 350 may include additional (or alternative) fields (not shown) than those illustrated in FIG. 3B.

Alias field 352 may store a name or identifier that uniquely identifies a user (i.e., participant) of a backgammon gaming session. Date field 354 may store information indicating the date that the user in alias field 352 participated in a backgammon gaming session. Time field 356 may store information indicating the time that the user in alias field 352 participated in a backgammon gaming session. Preferences field 358 may store information indicating the preferences that were set in the backgammon gaming session.

The information in database 350 may be stored, for example, in chronological order. As such, the alias of users may appear in multiple locations in database 350. For example, as illustrated in FIG. 3B, user "bobsmith" participated in a backgammon gaming session at time 15:12:10 and again at time 15:17:04. This allows administrators to possibly target premium services, advertisements, etc. to users based on the games in which they participate most often.

Figure 4:
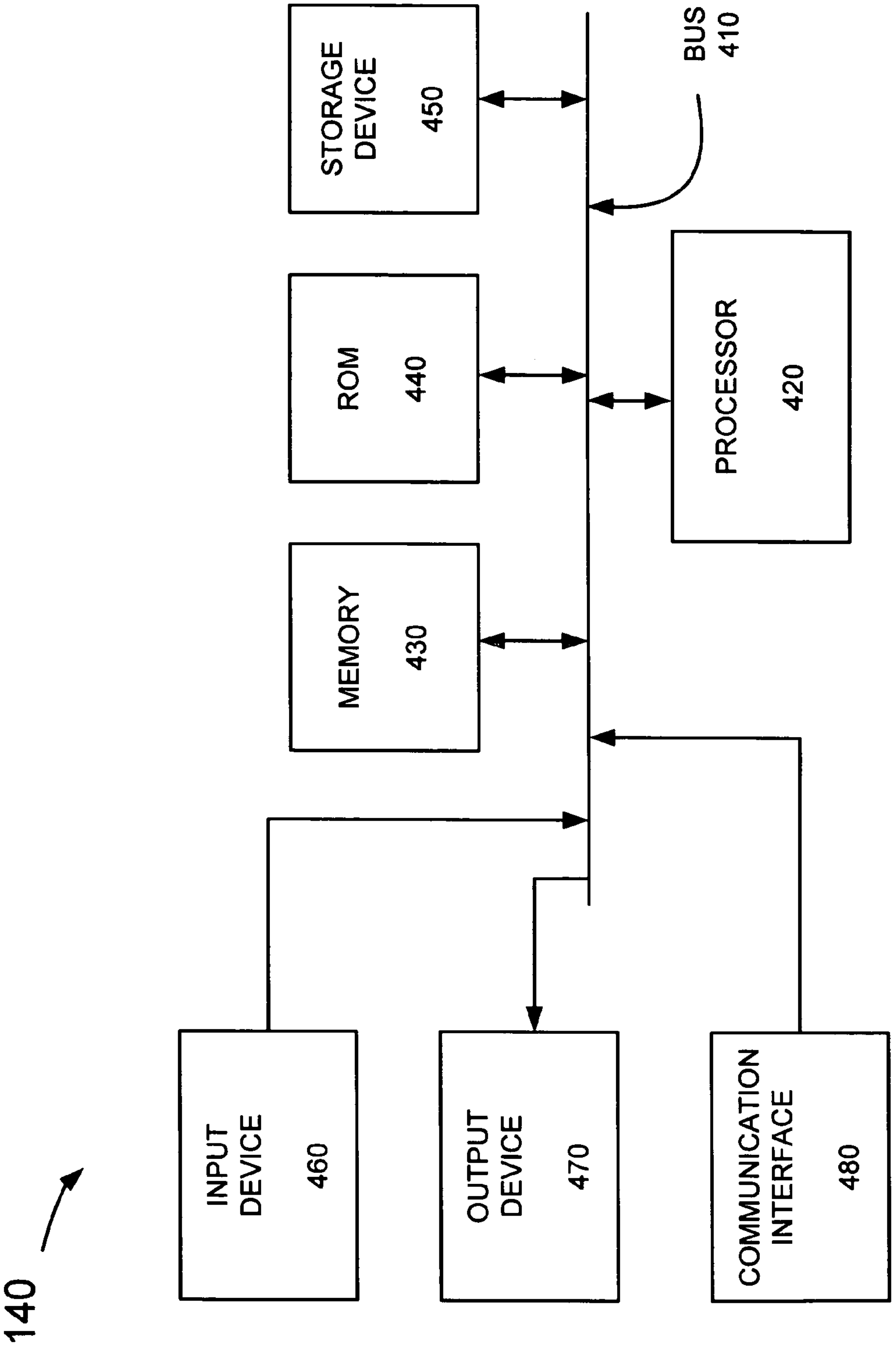
FIG. 4 illustrates an exemplary configuration of the user device of FIG. 1 in an implementation consistent with the principles of the invention.

FIG. 4 illustrates an exemplary configuration of user device 140 in an implementation consistent with the principles of the invention. As illustrated, user device 140 may include a bus 410, a processor 420, a memory 430, a ROM 440, a storage device 450, an input device 460, an output device 470, and a communication interface 480. Bus 410 may include one or more conventional buses that permit communication among the components of user device 140.

Processor 420 may include any type of conventional processor or microprocessor that interprets and executes instructions. Memory 430 may include a RAM or another type of dynamic storage device that stores information and instructions for execution by processor 420. Memory 430 may also be used to store temporary variables or other intermediate information during execution of instructions by processor 420.

ROM 440 may include a conventional ROM device and/or another type of static storage device that stores static information and instructions for processor 420. Storage device 450 may include a magnetic disk or optical disk and its corresponding drive and/or some other type of magnetic or optical recording medium and its corresponding drive for storing information and/or instructions.

Input device 460 may include any conventional mechanism or combination of mechanisms that permits the operator to input information to user device 140, such as a keyboard, a mouse, a microphone, a pen, a biometric input device, such as a voice recognition device, etc. Output device 470 may include any conventional mechanism or combination of mechanisms that outputs information to the operator, including a display, a printer, a speaker, etc.

Communication interface 480 may include any transceiver-like mechanism that enables user device 140 to communicate with other devices and/or systems, such as other user devices 140. For example, communication interface 480 may include a modem or an Ethernet interface. Alternatively, communication interface 480 may include other mechanisms for communicating via a network, such as network 110.

User device 140 may implement the functions described below in response to processor 420 executing software instructions contained in a computer-readable medium, such as memory 430. A computer-readable medium may be defined as one or more memory devices and/or carrier waves. In alternative embodiments, hardwired circuitry may be used in place of or in combination with software instructions to implement features consistent with the principles of the invention. Thus, implementations consistent with the principles of the invention are not limited to any specific combination of hardware circuitry and software.

Exemplary Processing

In conventional on-line gaming systems, when a first user desires to participate in on-line gaming session with a second user, the first and second users connect, possibly for a subscription fee, to a centralized server that manages the on-line gaming session. Instances may arise when users are prevented from participating in on-line gaming as a result of, for example, bandwidth limitations of the centralized server or the vulnerability of the centralized server to network attacks (e.g., denial of service attacks), outages due to natural or man-made disasters, etc. Customer satisfaction may be diminished during such instances.

Implementations consistent with the principles of the invention allow users to create on-line gaming sessions via peering relationships, thereby obviating the need for centralized servers and allowing users to pay for their network connection. Implementations consistent with the principles of the invention allow for service providers to capture revenue for bandwidth that might otherwise not be realized through the establishment of peer-to-peer gaming sessions. Moreover, by tuning past-generation hardware systems for communications and gaming, these systems may be used for participating in gaming sessions, thereby extending their useful life.

Figure 5:
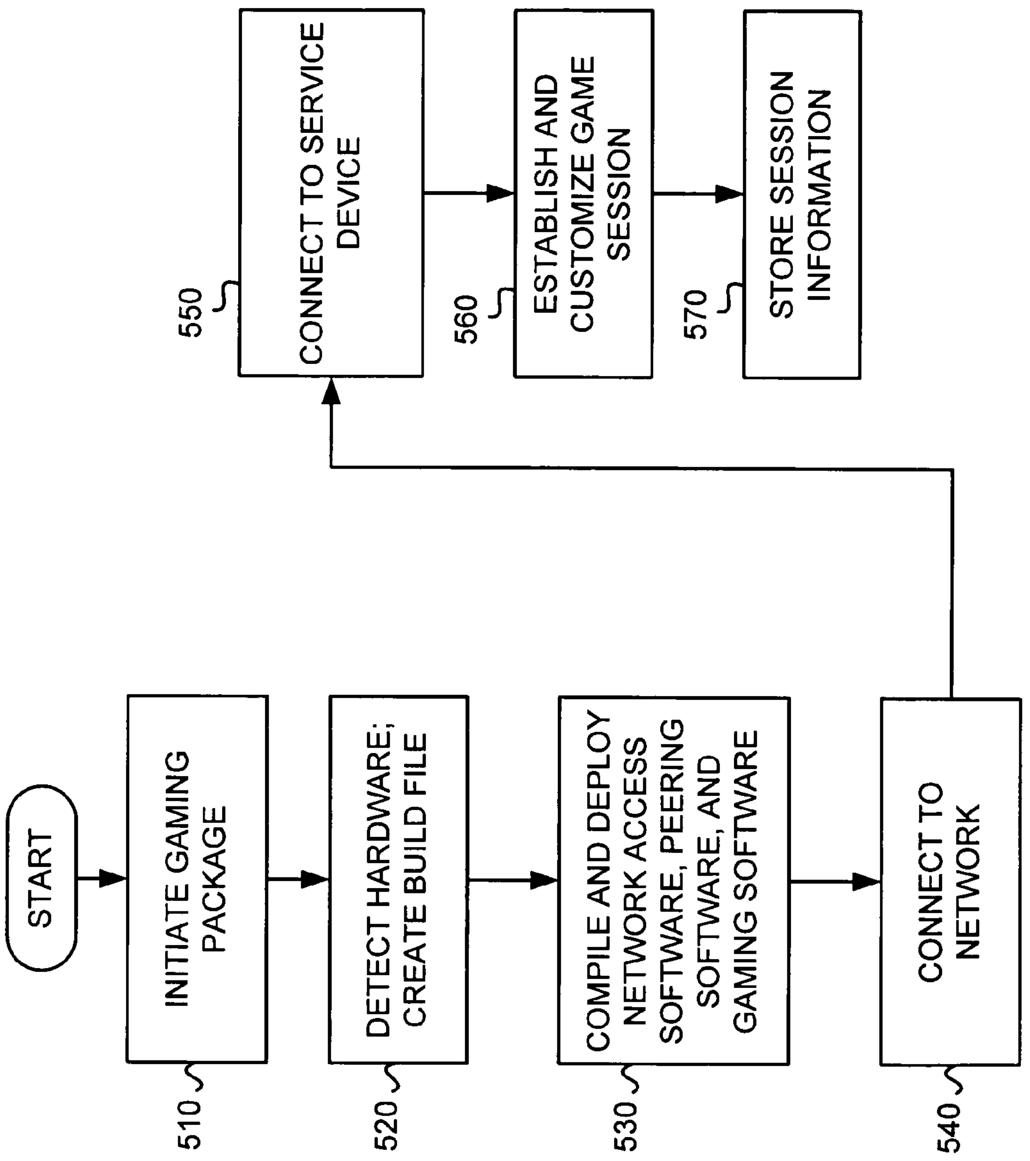
FIG. 5 illustrates an exemplary process for providing peer-to-peer on-line gaming in an implementation consistent with the principles of the invention.

FIG. 5 illustrates an exemplary process for providing peer-to-peer on-line gaming in an implementation consistent with the principles of the invention. Processing may begin with the user initiating a gaming package at a user device 140 (act 510). The gaming package may be stored on any computer-readable medium. As defined above, a computer-readable medium may include one or more memory devices and/or carrier waves. In one implementation consistent with the principles of the invention, the computer-readable medium may include a compact disk (CD) or other similar type of medium.

Any mechanism within user device 140 that allows for the transfer of the gaming package onto the user device 140 may be used to initiate the gaming package. For example, the gaming package may be downloaded to user device 140 using communication interface 480 or, when the gaming package is stored on a CD or digital video disc (DVD), using storage device 450. The gaming package may be stored as a series of files on the computer-readable medium or may be included within a single executable file or zip file.

The gaming package may include, for example, an operating system (OS) kernel, auto-boot software, a hardware classification script, a build script, Internet access software, peering software, and gaming software. It will be appreciated that the gaming package may also include other software programs or scripts that aid in the installation of the gaming package and/or the establishment of a peering gaming session. The OS kernel may be based, for example, on Linux, freeBSD, or any other open-source OS. In one implementation consistent with the principles of the invention, the OS kernel is tuned for communications and gaming, meaning that the OS kernel is tuned, from a hardware classification standpoint, to support the peering and gaming software. As an option, the user of user device 140 may configure user device 140 to dual boot between any pre-existing OS on user device 140 and the OS kernel. Alternatively, the user may choose to have the gaming system OS kernel as the only OS on user device 140.

The auto-boot software may include conventional auto-boot software that automatically reboots user device 140. The hardware classification script may automatically detect the hardware in user device 140 and place the hardware information into a build file. The build script may compile and deploy the Internet access software, peering software, and gaming software based on the information in the build file.

The Internet access software may allow user device 140 to access a given Internet Service Provider (ISP) via a dial-up connection or a wireline or wireless broadband connection. Via the Internet access software and communications interface 480, user device 140 may also communicate with service device 120 and/or warehouse 130. The peering software may include any type of software that allows user device 140 to establish a peer-to-peer connection with another user device. For example, the peering software may include WinMX or other similar types of peering software. The gaming software may include the software for the actual game(s) that the user wishes to play. In one implementation, the gaming software may include multiplayer games, such as board games (e.g., chess, checkers, backgammon, etc.), card games (e.g., hearts, bridge, poker, etc.), sports games (e.g., golf, baseball, football, etc.), and/or other types of multiplayer (or multi-participant) games.

For explanatory purposes only, it is assumed hereafter that the gaming package is contained on a CD. A user of user device 140 may load the gaming package CD into the CD-ROM drive of user device 140. The OS kernel may then be loaded onto user device 140. The auto-boot software may then cause user device 140 to reboot into the OS kernel, with minimal OS capabilities to support hardware detection.

The hardware classification script may detect the hardware in user device 140 (act 520). The hardware classification script may automatically detect, for example, the hard disk drive, monitor, video capabilities, memory, central processing unit (CPU), communications devices (e.g., modem), and network interfaces of user device 140 and place this information in a build file (act 520). The build script may then use this build file that identifies the hardware in user device 140 to compile and deploy the Internet access software, peering software, and gaming software from the gaming package (act 530).

Upon installation of the gaming package, the user of user device 140 may begin participating in peer-to-peer gaming. To begin peer-to-peer gaming, the user may cause user device 140 to connect to a network, such as the Internet (act 540). User device 140 may connect to the Internet via a dial-up connection or a broadband wireless or wireline connection. In one implementation, the connection may be established using Virtual Private Network (VPN) security (e.g., Secure Internet Protocol (IPSec), Hypertext Transfer Protocol over Secure Socket Layer (HTTPS), etc.).

The user may then establish a connection to a service device 120 (act 550). In one implementation, service device 120 may provide an Internet Relay Chat (IRC) session for the gaming community. Other user devices 140 may be notified of this new user device 140 by new user device 140 announcing itself in a well-known manner.

Figure 6:
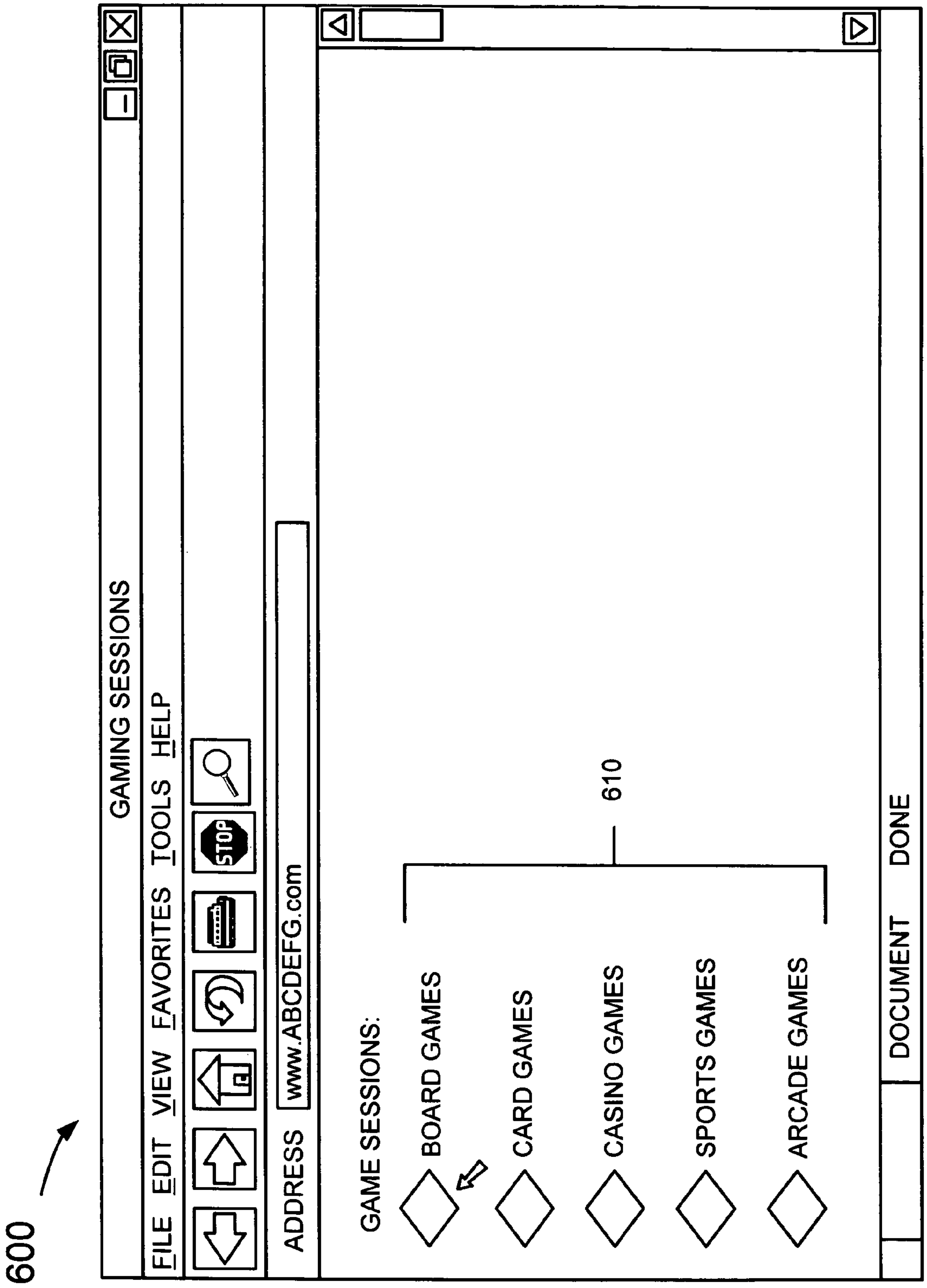
FIGS. 6-8 illustrate exemplary graphical user interfaces that may be provided to a user in an implementation consistent with the principles of the invention.

Gaming sessions may be established between peers (i.e., user devices 140) as the user desires (act 560). Gaming sessions may be organized by entering user preferences for sessions and then using peering and self-organizing software to establish links with other user devices 140 with similar preferences. FIG. 6 illustrates an exemplary graphical user interface 600 that may be provided to a user at user device 140 after connecting to service device 120. As illustrated, graphical user interface 600 may allow the user to select from among the categories of games 610 for which gaming sessions have been established or are available. The categories of games 610 may include, for example, board games, card games, casino games, sports games, arcade games, and the like.

Figure 7:
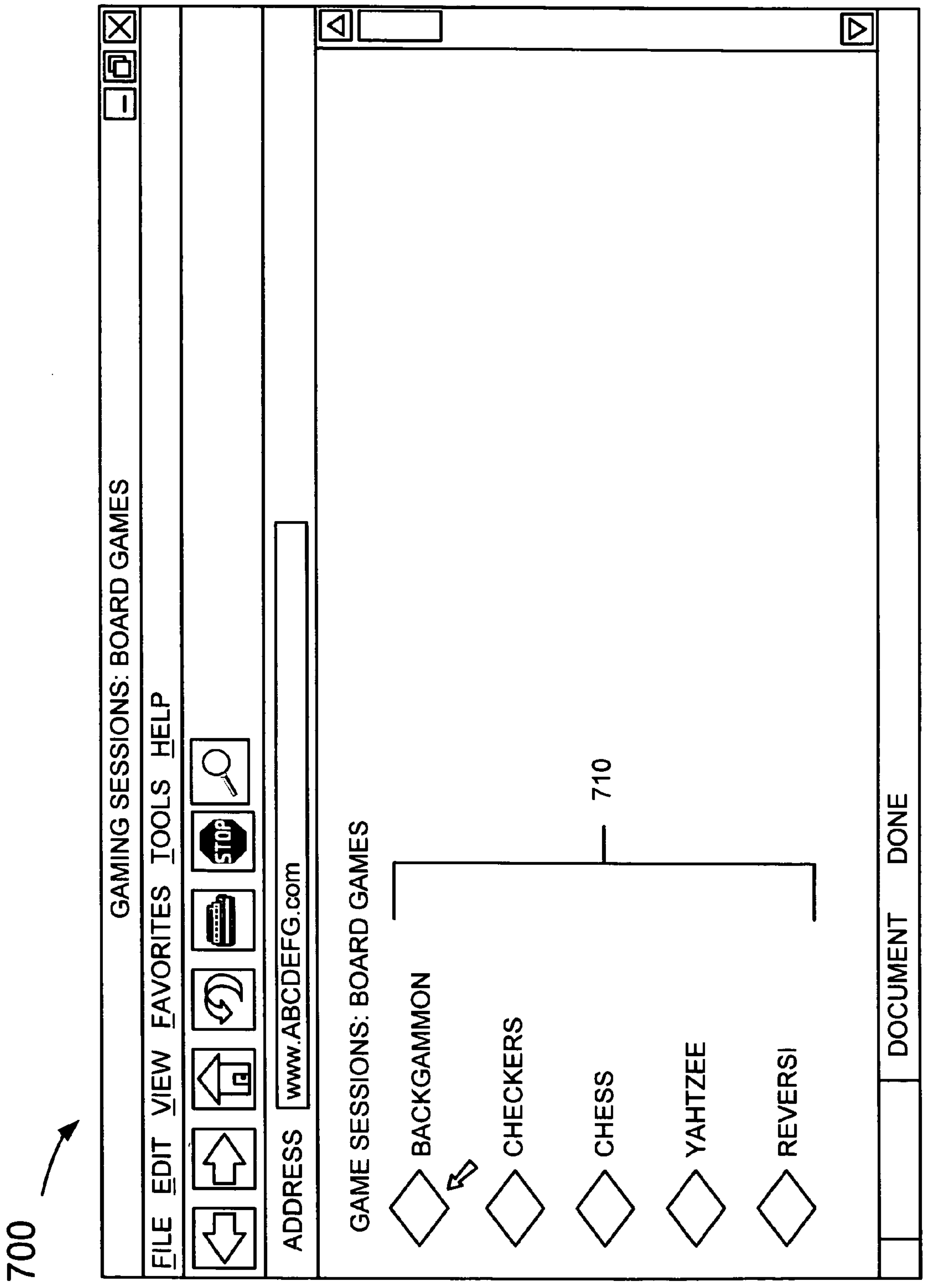

Assume that the user selects the board games category. FIG. 7 illustrates an exemplary graphical user interface 700 that may be provided to the user in response to the selection of the board games category. As illustrated, graphical user interface 700 may provide a list of games 710 that for which gaming sessions have been established or are available. The list of games 710 may include, for example, backgammon, checkers, chess, yahtzee, reversi, and the like. If the gaming package does not include one of the games listed in the board games category (or any of the other categories), the user may be presented with an option of downloading (possibly for a fee) the desired gaming software.

Figure 8:
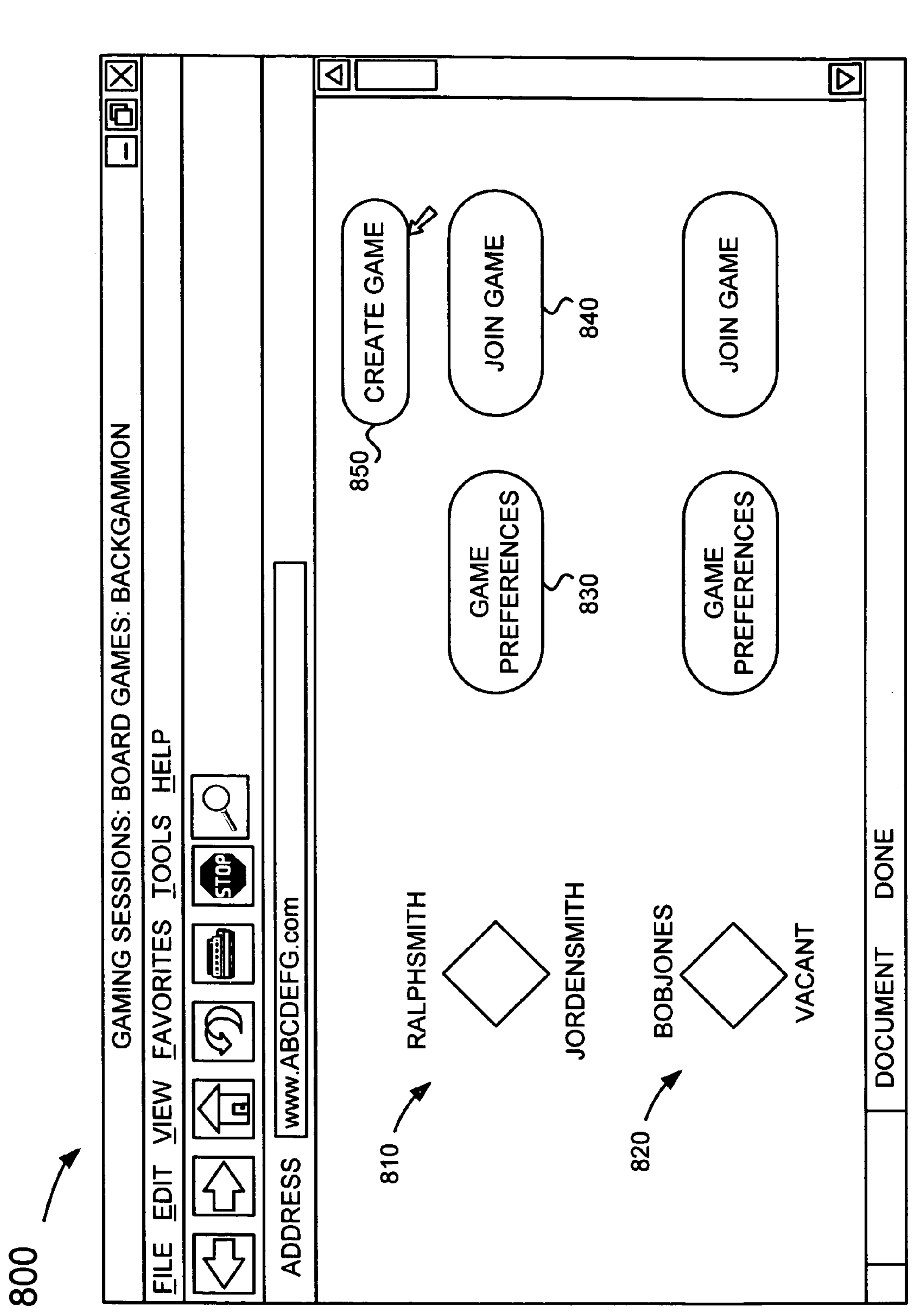

Assume that the user's device 140 includes backgammon gaming software and that the user selects backgammon from list 710. FIG. 8 illustrates an exemplary graphical user interface 800 that may be provided to the user in response to selection of backgammon from the list of board games. As illustrated, graphical user interface 800 may display established gaming sessions, which include those that are in progress and those that are waiting for participants. For example, gaming session 810 is one that may be already in progress, while in gaming session 820, user "BOBJONES" is waiting for another user to begin the game. Graphical user interface 800 may provide the user with the ability to view the game preferences 830 of any established session. For example, a user may specify the length of a backgammon match (e.g., best of 5 series) and/or whether gammons will be taken into account. The user may also specify a time limit in which each player will have to make a move. Graphical user interface 800 may also provide the user with the ability to join a game. For example, a user may join session 820 and play backgammon against user "BOBJONES" by clicking button 840.

If the user so desires, the user may establish his/her own gaming session by, for example, clicking create game button 850. The user may then be asked to set his/her gaming preferences. Once established, the user's name may appear in graphical user interface 800.

When a user joins a gaming session with a second user device, a peer-to-peer gaming session may be established between the first user device and the second user device using peering and self-organizing software. In the peer-to-peer gaming session the first and second user devices communicate directly with one another. If server devices 120 fail while the gaming session is ongoing, the gaming session can still continue. At the conclusion of the gaming session, the user devices may again reconnect to server devices 120.] Users can start new gaming sessions, enter existing gaming sessions, and/or restart previous (or saved) gaming sessions.

Session information may be stored on user devices 140 or on service device 120 (act 570, FIG. 5). Since service devices 120 may be geographically distributed, the session information may be duplicated in warehouse 130. As set forth in FIG. 3 above, the session information may include information identifying the users in system 100, the current network addresses of user devices 140 in system 100, and gaming sessions in which users participated and the date and time in which the user participated in those gaming sessions.

The information in warehouse 130 may be mined using classification techniques to detect relationships between gaming participants. The classification techniques may include, for example, artificial neural networks, heuristics, Rough Set Theory, or the like. The session information in warehouse 130 may be mined to determine customer satisfaction. Customer satisfaction may, for example, be correlated to the number of game downloads, the number of players in a concurrent or continuing game session, the number of times a game session is reinitiated, or other information. In addition, the session information in warehouse 130 may be used to identify marketing opportunities. For example, premium services may be presented to users in system 100 based on relationships identified in the session information. The premium services may include software updates, new gaming scenarios, player information storage, and the like. Alternatively or in addition, advertisements may be targeted to users in system 100 based on relationships identified in the session information.

Service device 120 may offer users the ability to upload new games to service device 120 for premium service credit or other considerations (e.g., free updates or downloads). In this way, users may share these new games with other users in system 100.

In an alternative implementation consistent with the principles of the invention, the gaming sessions may be used for grid computing. The grid computing may be used in creating complex game session scenarios or other uses that require massive computational capabilities. Moreover, by adding artificial intelligence to each user device 140 in system 100 and placing the software in robotic devices, a suite of autonomous peers may be created to perform a task, such as for use in construction, manufacturing, military operations, etc. The above-described system 100 may further be used as an aggregation service for obtaining any type of customer preferences (e.g., real time customer surveys).

CONCLUSION

Systems and methods, consistent with the principles of the invention, allow for peer-to-peer gaming in a communications network.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with respect to FIG. 5, the order of the acts may be varied in other implementations consistent with the present invention. Moreover, non-dependent acts may be implemented in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method for establishing a gaming session between a first network device that includes an operating system and at least one second network device in a communications network, the method comprising:

receiving a gaming package,
  the gaming package including:
    peering software,
    an operating system kernel,
      the operating system kernel being tuned to support the peering software,
    an auto-boot component,
    a hardware classification script,
    a build script, and
    network access software, and
  receiving the gaming package being performed by the first network device;
initiating the gaming package based on receiving the gaming package,
  initiating the gaming package being performed by the first network device;
loading the operating system kernel based on initiating the gaming package,
  loading the operating system kernel being performed by the first network device;
causing the first network device to boot into the operating system kernel,
  booting the first network device into the operating system kernel causing the first network device to have an amount of operating system capability to support hardware detection, and
  causing the first network device to boot into the operating system kernel being performed by the first network device using the auto-boot component;
detecting a hardware configuration of the first network device,
  detecting the hardware configuration being performed by the first network device using the hardware classification script;
generating a configuration file based on detecting the hardware configuration,
  generating the configuration file being performed by the first network device using the build script;
compiling the network access software and the peering software using the configuration file,
  compiling the network access software and the peering software being performed by the first network device;
installing the network access software and the peering software using the configuration file,
  installing the network access software and the peering software being performed by the first network device;
connecting the first network device to the communications network using the installed network access software,
  connecting the first network device to the communications network being performed by the first network device;
establishing a peer-to-peer gaming session with the at least one second network device,
  establishing the peer-to-peer gaming session being performed by the first network device;
storing information relating to the peer-to-peer gaming session,
  storing the information being performed by the first network device;
terminating the peer-to-peer gaming session with the at least one second network device,
  terminating the peer-to-peer gaming session being performed by the first network device; and
re-establishing the peer-to-peer gaming session with the at least one second network device based on the stored information,
  re-establishing the peer-to-peer gaming session being performed by the first network device.

2. The method of claim 1, further comprising:
installing gaming software using the configuration file.

3. The method of claim 1, where detecting the hardware configuration includes:
determining a video capability of the first network device, and
determining a configuration of one or more of:
  a hard disk drive,
  a monitor,
  a memory,
  a processor,
  a communications interface, or
  a network interface of the first network device.

4. The method of claim 1, further comprising:
connecting, prior to establishing the peer-to-peer gaming session, to a server associated with the gaming session.

5. The method of claim 4, where the server includes an Internet Relay Chat (IRC) server.

6. The method of claim 1, where connecting to the communications network includes:

connecting to the communications network using Virtual Private Network (VPN) security.

7. The method of claim 1, further comprising:

determining that the first network device includes a first configuration setting; and where causing the first network device to boot into the operating system kernel includes:

causing the first network device to dual boot between the operating system and the operating system kernel based on the first network device including the first configuration setting.

8. The method of claim 1, further comprising:

removing the operating system after loading the operating system kernel.

9. The method of claim 1, where loading the operating system kernel includes:

causing the first network device to be tuned for communications and peer-to-peer gaming based on loading the operating system kernel.

10. A device comprising:

a memory to store instructions; and a processor to execute the instructions to:

receive a gaming package, the gaming package including:

gaming software, an operating system kernel, a script for detecting a hardware configuration of the device, software for accessing a network, and peering software, load the operating system kernel based on receiving the gaming package, detect a hardware configuration of the device using the script, compile the software for accessing the network and the peering software based on the detected hardware configuration of the device, install the software for accessing the network and the peering software based on the detected hardware configuration of the device, connect to a server based on installing the software for accessing the network and the peering software, cause, based on connecting to the server, a graphical user interface to be displayed, provide, via the graphical user interface, information identifying a plurality of gaming sessions, receive, via the graphical user interface, a selection of one of the plurality of gaming sessions, establish, based on the selection of the one of the plurality of gaming sessions, a peer-to-peer gaming session with another device over the network using the software for accessing the network and the peering software, store information relating to the peer-to-peer gaming session, terminate the peer-to-peer gaming session, and re-establish the peer-to-peer gaming session based on the stored information.

11. The device of claim 10, where the operating system kernel includes an open-source operating system kernel.

12. The device of claim 10, where, when receiving the gaming package, the processor is to further execute the instructions to:

receive the gaming package from one of:

a compact disk, or a digital video disc.

13. The device of claim 10, where, when receiving the gaming package, the processor is to further execute the instructions to:

download the gaming package from the network.

14. The device of claim 10, where, when detecting the hardware configuration, the processor is to further execute the instructions to:

determine a video capability and a configuration of one or more of:

a hard disk drive of the device, a monitor of the device, a memory of the device, a processor of the device, a communications interface of the device, or a network interface of the device.

15. The device of claim 10, where the information relating to the peer-to-peer gaming session includes:

information identifying a game being played in the peer-to-peer gaming session.

16. The device of claim 10, where, when connecting to the server, the processor is to further execute the instructions to:

receive, from the server, the information identifying the plurality of gaming sessions.

17. The device of claim 10, where, when connecting to the server, the processor is to further execute the instructions to:

establish a connection to the network using Virtual Private Network security.

18. A system comprising:

a network device to:

receive a gaming package that includes an operating system kernel, an auto-boot component, a script for detecting a hardware configuration of the device, software for accessing a network, and peering software, load the operating system kernel based on receiving the gaming package, cause the network device to boot into the operating system kernel using the auto-boot component, booting the network device into the operating system kernel causing the network device to have an amount of operating system capability to support hardware detection, detect a hardware configuration of the network device using the script, generate a configuration file based on detecting the hardware configuration, compile the software for accessing the network and the peering software using the configuration file, install the software for accessing the network and the peering software using the configuration file, connect the network device to the network using the installed software for accessing the network, obtain a list of games from a server, the list of games being obtained using the software for accessing the network, select a game identified in the list of games, establish, using the peering software, a peer-to-peer gaming session with at least one other network device based on selecting the game, store information relating to the peer-to-peer gaming session, terminate the peer-to-peer gaming session, and re-establish the peer-to-peer gaming session with the at least one other network device based on the stored information.

19. The system of claim 18, where, when storing the information relating to the established peer-to-peer gaming session, the network device is further to:

cause the information relating to the established peer-to-peer gaming session to be stored by the server.

20. The system of claim 19, where the server includes a plurality of geographically distributed servers.

21. The system of claim 20, where, when storing the information relating to the peer-to-peer gaming session, the network device is further to:

cause the information relating to the peer-to-peer gaming session to be stored at a warehouse associated with the server, where the warehouse stores information relating to established peer-to-peer gaming sessions associated with each of the plurality of geographically distributed servers.

22. The system of claim 18, where the stored information relating to the peer-to-peer gaming session includes:

information identifying the selected game, and information identifying users associated with the peer-to-peer gaming session.

23. The system of claim 22, where the network device is further to:

receive at least one advertisement based on the stored information relating to the peer-to-peer gaming session.

24. The system of claim 22, where the network device is further to:

receive at least one fee-based service based on the stored information relating to the peer-to-peer gaming session.

25. A method comprising:

receiving, by a network device, a gaming package, the gaming package including:

an operating system kernel, a script for detecting a hardware configuration of the network device, software for accessing a network, peering software, and gaming software;

installing, by the network device, the operating system kernel based on receiving the gaming package;

detecting, by the network device, a hardware configuration of the network device using the script;

compiling, by the network device, the software for accessing the network, the peering software, and the gaming software based on the detected hardware configuration of the network device;

installing, by the network device, the software for accessing the network, the peering software, and the gaming software based on the detected hardware configuration of the network device;

connecting, by the network device, to a server based on installing the software for accessing the network, the peering software, and the gaming software;

causing, by the network device and based on connecting to the server, a graphical user interface to be displayed;

providing, by the network device and via the graphical user interface, information identifying a plurality of gaming sessions;

receiving, by the network device and via the graphical user interface, a selection of one of the plurality of gaming sessions, establishing, by the network device and based on the selection of the one of the plurality of gaming sessions, a peer-to-peer gaming session with at least one other network device using the software for accessing the network, the peering software, and the gaming software;

storing information relating to the peer-to-peer gaming session;

terminating the peer-to-peer gaming session; and re-establishing the peer-to-peer gaming session with the at least one other network device based on the stored information relating to the peer-to-peer gaming session.

26. The method of claim 25, where the gaming package includes an auto-boot component, and where installing the operating system kernel includes:

causing the network device to boot into the operating system kernel using the auto-boot component, booting the network device into the operating system kernel causing the network device to have an amount of operating system capability to support hardware detection.

27. The method of claim 25, further comprising:

generating a configuration file based on detecting the hardware configuration of the network device; and where compiling the software for accessing the network, the peering software, and the gaming software includes:

compiling the software for accessing the network, the peering software, and the gaming software using the configuration file.

* * * * *